United States Patent
Tomimori

(10) Patent No.: US 7,430,708 B2
(45) Date of Patent: Sep. 30, 2008

(54) PORTABLE TERMINAL DEVICE

(75) Inventor: Hiroyuki Tomimori, Tokyo (JP)

(73) Assignee: NEC Corporation, Tokyo (JP)

( * ) Notice: Subject to any disclaimer, the term of this patent is extended or adjusted under 35 U.S.C. 154(b) by 603 days.

(21) Appl. No.: 10/791,802

(22) Filed: Mar. 4, 2004

(65) Prior Publication Data

US 2004/0177131 A1 Sep. 9, 2004

(30) Foreign Application Priority Data

Mar. 5, 2003 (JP) ............................... 2003-058109

(51) Int. Cl.
*G06F 17/00* (2006.01)
(52) U.S. Cl. ........................ 715/206; 707/7; 715/205; 715/207; 715/208
(58) Field of Classification Search ................ 707/201; 713/178; 715/733, 205, 206, 207, 208
See application file for complete search history.

(56) References Cited

U.S. PATENT DOCUMENTS

| | | | | |
|---|---|---|---|---|
| 4,611,280 | A * | 9/1986 | Linderman | 712/300 |
| 6,032,162 | A * | 2/2000 | Burke | 715/501.1 |
| 6,182,113 | B1 * | 1/2001 | Narayanaswami | 709/203 |
| 6,757,675 | B2 * | 6/2004 | Aiken et al. | 707/3 |
| 6,819,267 | B1 * | 11/2004 | Edmark et al. | 340/988 |
| 6,874,017 | B1 * | 3/2005 | Inoue et al. | 709/217 |
| 7,167,901 | B1 * | 1/2007 | Beadle et al. | 709/207 |
| 2001/0018353 | A1 * | 8/2001 | Ishigaki | 455/566 |
| 2002/0035609 | A1 * | 3/2002 | Lessard et al. | 709/217 |
| 2002/0138650 | A1 * | 9/2002 | Yamamoto et al. | 709/245 |
| 2002/0147796 | A1 * | 10/2002 | Chung | 709/220 |
| 2002/0152273 | A1 * | 10/2002 | Pradhan et al. | 709/206 |
| 2002/0161720 | A1 * | 10/2002 | Hamazaki et al. | 705/64 |
| 2002/0173317 | A1 * | 11/2002 | Nykanen et al. | 455/456 |
| 2002/0174117 | A1 * | 11/2002 | Nykanen | 707/4 |
| 2002/0198898 | A1 * | 12/2002 | Werner | 707/200 |
| 2003/0069940 | A1 * | 4/2003 | Kavacheri et al. | 709/217 |
| 2004/0031732 | A1 * | 2/2004 | Whitnable | 209/584 |
| 2004/0260604 | A1 * | 12/2004 | Bedingfield, Sr. | 705/14 |
| 2005/0134945 | A1 * | 6/2005 | Gallagher | 358/527 |

FOREIGN PATENT DOCUMENTS

| | | |
|---|---|---|
| JP | 10-334120 A | 12/1998 |
| JP | 2000-187666 A | 7/2000 |

(Continued)

OTHER PUBLICATIONS

PalmPilot: The Ultimate Guide, Second edition□□by David Pogue□□Copyright 1999□□Publisher: O'Reilly & Associates, Inc., 101 Morris Street, Sebstopol, CA 95472.*

*Primary Examiner*—Rachna Singh
*Assistant Examiner*—Gregory A Distefano
(74) *Attorney, Agent, or Firm*—Sughrue Mion, PLLC

(57) ABSTRACT

A portable terminal device is provided which is capable of displaying URLs in a manner so as to be fitter for a use state when a bookmark function provided by browser being installed in the portable terminal device is used. A situation information acquiring unit acquires position information about longitude and latitude from a position information acquiring unit. The situation information acquiring unit acquires information about time from a time information acquiring unit and information about a day of a week from the time information acquiring unit. A bookmark managing unit acquires the situation information and stores the situation information together with a URL passed from a browser processing unit and its title in a bookmark storing unit.

1 Claim, 4 Drawing Sheets

FOREIGN PATENT DOCUMENTS

| | | |
|---|---|---|
| JP | 2000-270043 A | 9/2000 |
| JP | 2001-237913 A | 8/2001 |
| JP | 2001-256146 A | 9/2001 |
| JP | 2002-157263 A | 5/2002 |
| JP | 2002-288199 A | 10/2002 |
| JP | 2002-539559 A | 11/2002 |

* cited by examiner

PORTABLE TERMINAL DEVICE

BACKGROUND OF THE INVENTION

1. Field of the Invention

The present invention relates to a portable terminal device installing browser having a bookmark function to record a URL (Uniform Resource Locator) of a Web server being connected over an internet telecommunication network for reuse of the URL.

The present application claims priority of Japanese Patent Application No. 2003-058109 filed on Mar. 5, 2003, which is hereby incorporated by reference.

2. Description of the Related Art

As a portable cellular phone and/or a PDA (Personal Digital Assistant) become highly functional, a browser function for the Internet that had been conventionally used in a fixed terminal such as a desktop computer or a like can be now achieved on a portable information terminal. This enables a user to obtain information from other servers through the Internet by using the browser function installed in a portable terminal device even while the user is out or is moving. Moreover, service employing such the information distributing system is becoming substantial (see Japanese Patent Application Laid-open No. 2000-187666).

However, in a portable terminal device such as a portable cellular phone or a like, unlike in the case of a desktop computer being equipped with an upper inputting unit such as a keyboard and a mouse and with a high resolution display or a like, an inputting device and/or a screen display being used by a user are limited in size. Due to this, the portable terminal device has a problem in that it takes time and labor to enter characters or to perform an operation of software.

In normal cases, the browser supports a bookmark function. That is, this is a function that, in order to save a user time and labor of inputting a URL each time, by recording, in advance, a URL having a high use frequency, a user can specify the URL when the recorded URL is to be displayed next time, only by selecting a targeted URL from a list of URLs being already recorded.

In the case of a terminal such as a portable cellular phone that requires much time and labor of inputting characters, the bookmark function described above is of importance. However, when the number of recorded URLs increases, a portable terminal device having its screen being small in size presents a problem in that URLs that can be displayed in one screen are limited in number and it takes much time to search for a targeted URL.

To solve this problem, conventional technology is proposed in which, by sorting URLs to be displayed on a screen, a targeted URL can be more easily searched for (Japanese Patent Application Nos. Hei 10-34120, 2000-187666, 2002-288199, and 2002-539559). The above technology can be achieved by sorting URLs in order of close reference frequency or close reference time. Moreover, order of displaying URLs is set according to designation of a user so that a targeted URL can be easily searched for.

Moreover, the applicant of the present invention could not find any reference of prior art related to the present invention before the application of the present invention, except references on prior art technology to be specified by the prior art reference information described in the Specification of the present invention.

There are cases in which, depending on a state in which a browser function is used in a portable terminal device, various URLs having high use frequency are available. However, in the conventional technology, order in which URLs are displayed on a screen is in a same state even if each of the URLs is used in a different use environment and a state in which URLs to be displayed are sorted is not fit for a use state.

SUMMARY OF THE INVENTION

In view of the above, it is an object of the present invention to provide a portable terminal device which is capable of displaying URLs in a manner so as to be fitter for a use state when a bookmark function that the browser installed in the portable terminal device has is used.

According to a first aspect of the present invention, there is provided a portable terminal device including:

a communication control unit being connected to an internet communication network to feed and receive information;

a browser processing unit to acquire a file being stored in a server over the internet communication network connected through the communication control unit;

a sort key storing unit in which sort keys are stored;

a bookmark storing unit in which a bookmark recording a URL (Uniform Resource Locator) of a server over the internet communication network is stored;

a situation information acquiring unit to acquire situation information showing a state occurring when the browser processing unit has obtained a file through the internet communication network;

a bookmark managing unit to record a URL of a server storing a file that the browser processing unit has obtained through the internet communication network in a bookmark being stored in the bookmark storing unit in a manner that situation information that the situation information acquiring unit has acquired is annexed to the URL;

a bookmark sorting unit to sort URLs being recorded in a bookmark stored in the bookmark storing unit depending on a use situation; and a displaying unit to display URLs sorted by the bookmark sorting unit.

In the foregoing, a preferable mode is one wherein the bookmark managing unit, when a number of pieces of situation information annexed to URLs being recorded in the bookmark stored in the bookmark storing unit reaches a preset number, replaces oldest situation information with new situation information.

An additional preferable mode is one that wherein further includes; a position information acquiring unit to acquire information about a position of the portable terminal device; and a time information acquiring unit to acquire information about time when the browser processing unit has obtained a file through the internet communication network;

wherein situation information that the situation information acquiring unit acquires contains position information that the position information acquiring unit has obtained and information about time that the time information acquiring unit has obtained.

According to a second aspect of the present invention, there is provided a portable terminal device including:

a communication control unit being connected to an internet communication network to feed and receive information;

a browser processing unit to acquire a file being stored in a server over the internet communication network connected through the communication control unit;

a sort key storing unit in which sort keys are stored;

a bookmark storing unit in which a bookmark recording a URL (Uniform Resource Locator) of a server over the internet communication network is stored;

a position information acquiring unit to acquire information about a position of the portable terminal device; and a time information acquiring unit to acquire information about time when the browser processing unit has obtained a file through the internet communication network;

a situation information acquiring unit to acquire situation information showing a state occurring when the browser processing unit has obtained a file through the internet communication network;

a bookmark managing unit to record a URL of a server storing a file that the browser processing unit has obtained through the internet communication network in a bookmark being stored in the bookmark storing unit in a manner that situation information that the situation information acquiring unit has acquired is annexed to the URL;

a bookmark sorting unit to sort URLs being recorded in a bookmark stored in the bookmark storing unit depending on a use situation; and a displaying unit to display URLs sorted by the bookmark sorting unit, wherein the bookmark managing unit, when a number of pieces of situation information annexed to URLs being recorded in the bookmark stored in the bookmark storing unit reaches a preset number, replaces oldest situation information with new situation information, and wherein situation information that the situation information acquiring unit acquires contains position information that the position information acquiring unit has obtained and information about time that the time information acquiring unit has obtained.

With the above configuration, depending on a use state of a portable terminal device occurring when a file is acquired from a server having a URL recorded by the bookmark function, order of displaying the URL already recorded is changed. As a result, an excellent effect that, when a bookmark function that the browser installed in the portable terminal device provides is used, the URL can be displayed in a manner so as to be fitter for the use state can be obtained.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
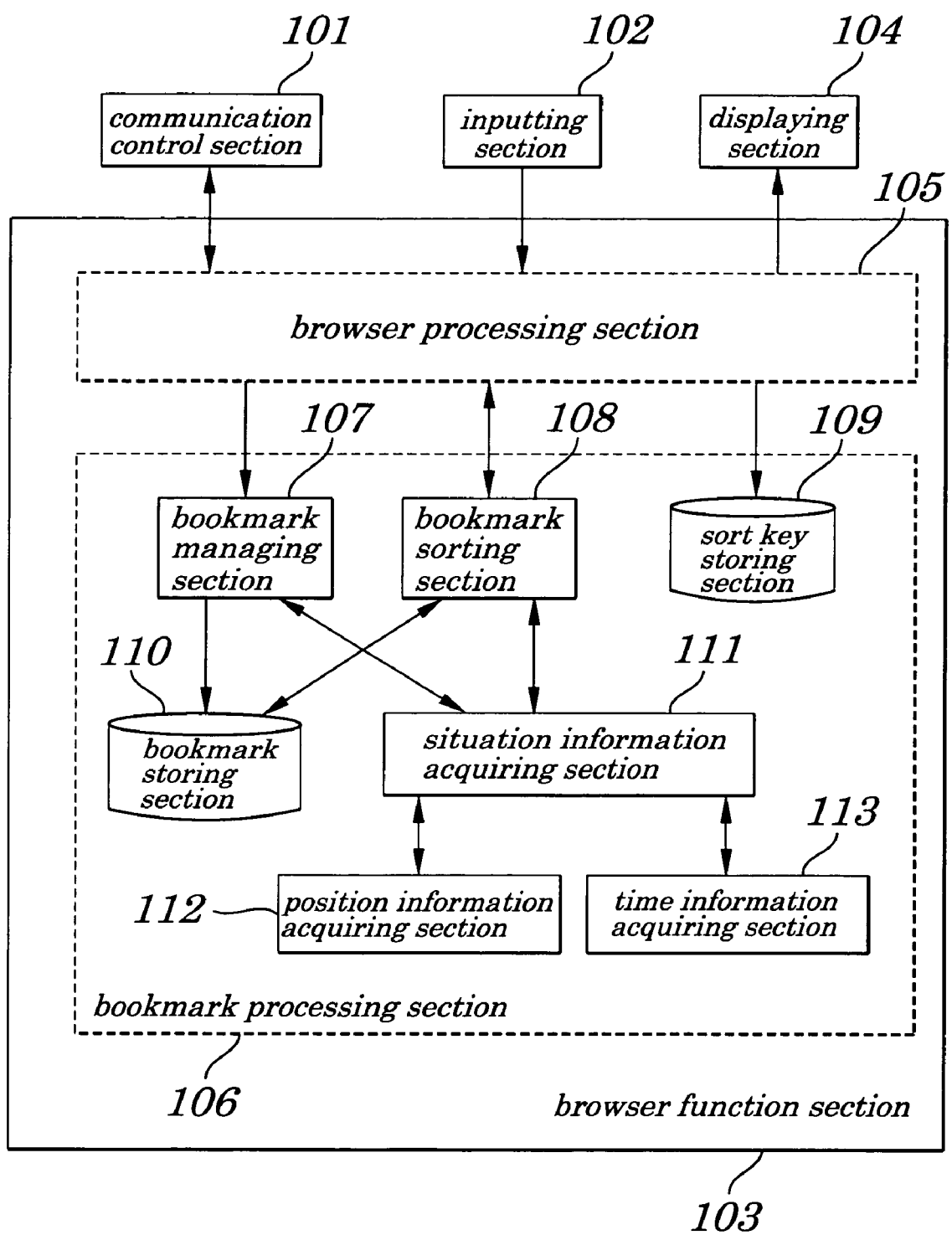
FIG. 1 is a diagram showing an example of configurations of a portable terminal device according to a first embodiment of the present invention.

FIG. 1 is a diagram showing an example of configurations of a portable terminal device according to a first embodiment of the present invention. As shown in FIG. 1, the portable terminal device has a communication control section 101 to feed and receive information which is connected to the internet communication network and an inputting section 102 to accept an input from a user. The portable terminal device also has a browser function section 103 to fetch various types of information being stored in a WWW (World Wide Web) server (not shown) over the internet communication network being connected through the communication control section 101. Moreover, the portable terminal device has a displaying section 104 to display the above information fetched from the browser function section 103.

The browser function section 103 has a known browser processing section 105 to obtain, analyze, and display a file of a HTML (Hypertext Markup Language) format being main processing of a browser and to provide a function such as a user interface and a bookmark processing section 106 to perform a bookmark function.

The bookmark processing section 106 includes a bookmark managing section 107, a bookmark sorting section 108, a sort key storing section 109, a bookmark storing section 110, a situation information acquiring section 111, a position information acquiring section 112, and a time information acquiring section 113.

The bookmark managing section 107, by a request from the browser processing section 105, records a new bookmark in the bookmark storing section 110 and makes a request for deleting and renewing a bookmark being already stored. The bookmark sorting section 108 sorts URLs recorded in a bookmark being stored in the bookmark storing section 110 depending on a situation/case in which a portable terminal device is put to use.

The sort key storing section 109 stores conditions for using information about situations to be used in an operation of sorting URLs to be performed by the bookmark sorting section 108. The bookmark storing section 110 stores, as described above, a bookmark together with information related to the bookmark. The situation information acquiring section 111, while the browser processing section 105 in the portable terminal device is being used, acquires information about a use situation that the portable terminal device can obtain. In the first embodiment, first, the position information acquiring section 112 acquires, as information about a use situation, information about a position of a portable terminal device required where a URL to be targeted is used. Also, the time information acquiring section 113 acquires information about time when a targeted URL is used. The information acquired as above is used as information (situation information) about a use situation that the portable terminal device can obtain.

The position information acquiring section 112 acquires, by using a function of, for example, a GPS (Global Positioning System) or a like, position information about longitude, latitude, or a like of a present place where a portable terminal device is used. The time information acquiring section 113 acquires information about a present day of a week, time, or a like when a portable terminal device is used from a system clock (not shown) installed in the portable terminal device.

An example of operations of the portable terminal device shown in FIG. 1 is described. As shown in a flowchart of FIG. 2, when a request for newly recording a bookmark is input by a user from the inputting section 102, the browser processing section 105 annexes information about a caption entitled to a URL to be recorded in a bookmark, and stores (records) newly the bookmark as a record requesting object and the annexed information about the caption in the bookmark managing section 107 (Step A1 in FIG. 2).

Next, the bookmark managing section 107 makes a request of the situation information acquiring section 111 to acquire information about a situation at a present point of time (Step A2). The situation information acquiring section 111, when accepting the request, first acquires information about longitude and latitude from the position information acquiring section 112 (Step A3). Moreover, the situation information acquiring section 111 acquires information about time from the time information acquiring section 113 (Step A4) and information about a day of a week from the time information acquiring section 113 (Step A5).

By the above operations, the bookmark managing section 107 having acquired various types of information (situation information) stores the situation information about a position, time, and a day of a week acquired from the situation information acquiring section 111, together with a URL and its title passed from the browser processing section 105, in the bookmark storing section 110 (Step A6). Thus, the bookmark storing section 110 stores information about a title and situation for each of the URLs, as shown in Table 1.

week if a sort key specifies information about the day of the week, from the situation information acquiring section 111.

Next, the bookmark sorting section 108 acquires all the URLs being recorded at present, their titles, and information corresponding to each of sort keys from the bookmark storing section 110 (Step B4). Then, the bookmark sorting section 108 compares the information about a situation at a present point of time acquired from the situation information acquiring section 111 with information about a situation of each of the URLs obtained from the bookmark storing section 110 and URLs are sorted in order of coming near to a present situation (Step B5).

After that, the bookmark sorting section 108 sends out a result from the sorting, together with a title, to the browser processing section 105 (Step B6). The browser processing section 105 having received a result from sorting of URLs sent from the bookmark sorting section 108 displays a list of titles of URLs in order of being sorted on the displaying section 104 (Step B7).

Next, an example of a sorting method employed when each of pre-input sort keys is set so as to specify each of information about a position, time and a day of a week is described. When a sort key specifies information about a position, a linear distance between a position represented by longitude

TABLE 1

| URL | Title | Information about positions (longitude and latitude) | Information about time | Information about day of week |
|---|---|---|---|---|
| http://kabu.co.jp | Stock price | (134.20, 45.30) | 10:00 | Monday |
| http://douro.co.jp | Information about traffic snarl | (134.33, 45.50) | 8:30 | Friday |
| http://norikae.co.jp | Guidance of transfer | (134.55, 45.70) | 13:00 | Tuesday |
| . | . | . | . | . |
| . | . | . | . | . |
| . | . | . | . | . |

Next, operations to be performed when a request for bookmark sorting is input by a user from the inputting section 102. Now, in the example, let it be presumed that a sort key to specify which situation information is to be used in sorting URLs has been, in advance, selected by the user from the inputting section 102. First, the browser processing section 105 having accepted a request for bookmark sorting stores a sort key specified by a user in the sort key storing section 109. Also, let it be assumed that a sort key that a user can use as a means for specifying information is only any one out of pieces of information about a situation being supported by a terminal. In the first embodiment of the present invention, a sort key that can be used as a means for specifying information is any one of three pieces of information including a position, time, and a day of a week.

Figure 3:
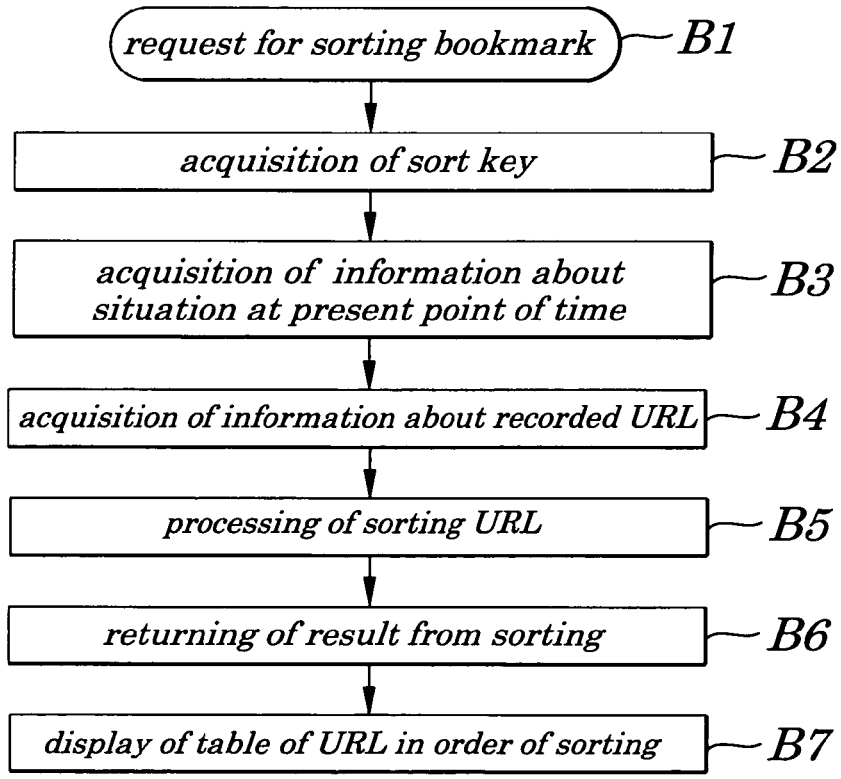
FIG. 3 is a flowchart showing an example of operations of the portable terminal device according to the first embodiment of the present invention.

Next, as shown in the flowchart of FIG. 3, the browser processing section 105 makes a request of the bookmark sorting section 108 to sort a bookmark (Step B1 in FIG. 3). The bookmark sorting section 108 having accepted the request acquires a key to be used for sorting bookmarks from the sort key storing section 109 (Step B2). Next, the bookmark sorting section 108 acquires information about a situation at a present point of time corresponding to an acquired sort key from the situation information acquiring section 111 (Step B3). The bookmark sorting section 108 acquires information about a position if a sort key specifies information about a position, information about time if a sort key specifies information about time, and information about a day of a and latitude of a present position and a position represented by longitude and latitude of each of the URLs is calculated and a URL is sorted in the order in which the calculated linear distance is short.

When a sort key specifies information about time or about a day of a week, a difference between a present time or a present day of a week and time or a day of a week of each of the URLs is calculated and URLs are sorted in the order in which the calculated difference is short. The calculation is performed in a manner that, if present time is presumed to be 18:00, a difference when time held by a URL is 13:00 or 23:00 is 5:00. If today is Thursday, a difference when a day of a week being held by a URL is Tuesday or Saturday is 2. Thus, when the bookmark sorting section 108 sorts a bookmark based on a sort key, a result from sorting is displayed on the displaying section 104 by the browser processing section 105 (Step B6).

Next, operations performed when a sorted URL is displayed on the displaying section 104 and a URL is selected by a user from a displayed table and a homepage specified by a selected URL is referenced by the browser function section 103 are described. A user selects a specified URL from a table of URLs displayed on the displaying section 104 and inputs this instruction into the inputting section 102. The browser processing section 105, by the above instructing input, acquires a file of a HTML format from the selected URL and displays a hypertext document using acquired files on the displaying section 104.

Figure 4:
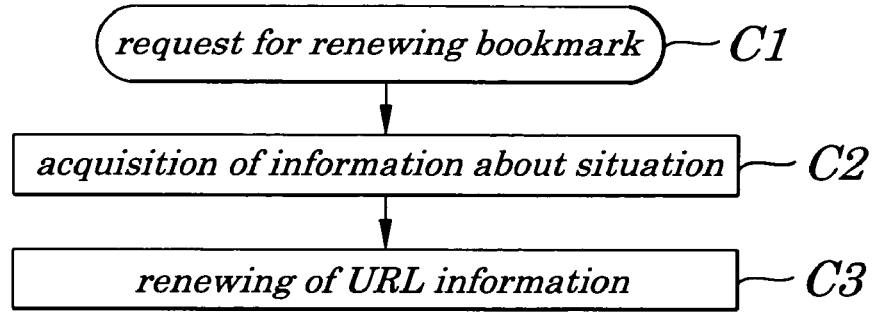
FIG. 4 is also a flowchart showing an example of operations of the portable terminal device according to the first embodiment of the present invention.

After that, the browser processing section 105 having accepted this request, as shown in FIG. 4, informs the bookmark managing section 107 of a selected URL and makes a request for renewing information about the bookmark recording (Step C1 in FIG. 4). The bookmark managing section 107 acquires all information (information about a situation) about a use situation at a present point of time from the situation information acquiring section 111 (Step C2) and overwrites information about a situation of a corresponding URL being stored in the bookmark storing section 110 and renews it (Step C3).

In the embodiment, as information about situations, information about a position, time, and/or day of a week is used for sorting a URL. However, the present invention is not limited to this. That is, information about a station, air port, and park or a like, information about a speed, altitude, or a like may be also used, as the information about situations, in sorting URLs.

As described above, in the embodiment, URLs are sorted in order of increasing a possibility of being most referenced based on a history of a past reference according to a use situation of a portable terminal device and is then displayed. As a result, even if the number of the URLs recorded in a bookmark increases, a targeted URL can be speedily retrieved. Moreover, according to the embodiment, since URLs are sorted automatically, setting of order of displaying bookmarks by a user is not required.

Second Embodiment

A second embodiment of the present invention will be described as below. In the second embodiment, two or more sort keys can be set (stored) in the sort key storing section 109. In a bookmark storing section 110, as shown in Table 2, two or more pieces (for example, up to 5 pieces) of situation information for each URL can be stored.

specification is information about a situation that can be used by the portable terminal device of the present invention and two or more sort keys can be set.

Figure 5:
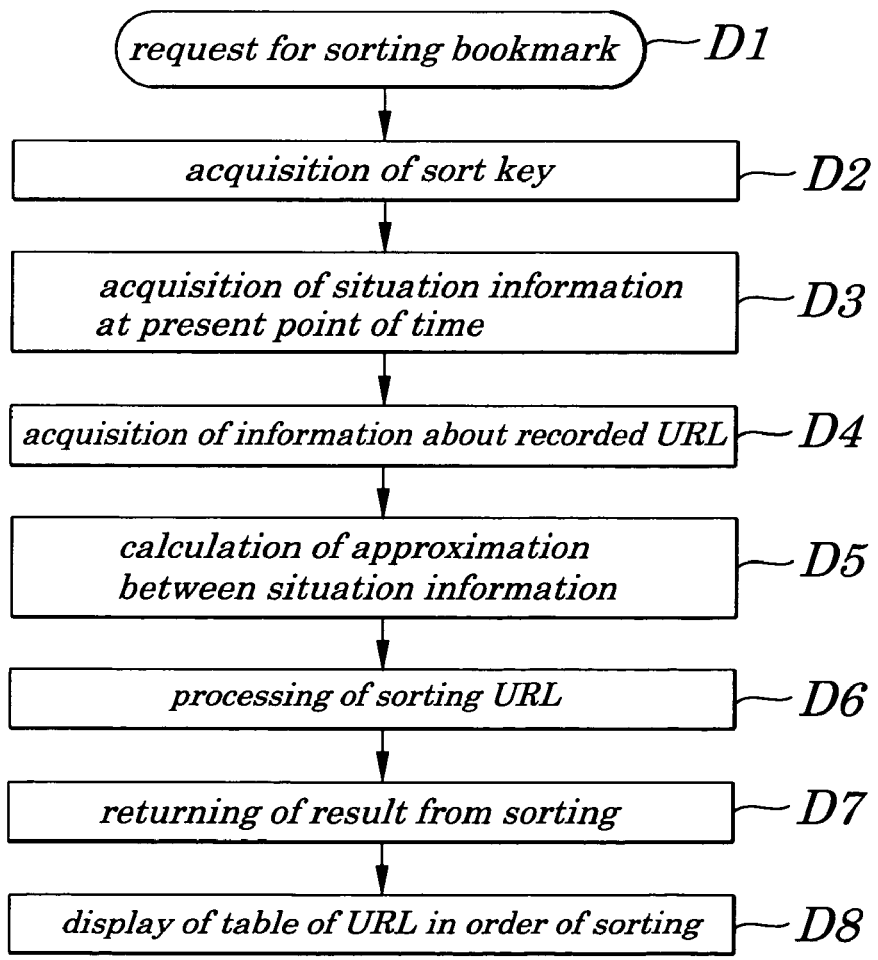
FIG. 5 is also a flowchart showing an example of operations of the portable terminal device according to a first embodiment of the present invention.

First, the browser processing section 105, when a request for bookmark sorting is input by a user through the inputting section 102, issues a request for sorting bookmarks to a bookmark sorting section 108. Next, as shown in a flowchart of FIG. 5, the bookmark sorting section 108 having accepted the above request (Step D1 in FIG. 5) acquires a key (Step D2) to be used for sorting bookmarks from the sort key storing section 109. Then, the bookmark sorting section 108 acquires situation information at a present point of time corresponding to an acquired sort key from a situation information acquiring section 111 (Step D3).

The bookmark sorting section 108 acquires information about a position if a sort key specifies information about a position, information about time if the sort key specifies information about time, and information about a day of a week if the sort key specifies information about the day of the week, from the situation information acquiring section 111.

Next, the bookmark sorting section 108 acquires all the URLs being recorded at present, their titles, and information corresponding to each of sort keys from the bookmark storing section 110 (Step D4). Then, the bookmark sorting section 108 converts into numbers a degree of approximation between situation information that each of the URLs holds and information about a situation at a present point of time (Step D5) and sorts all the URLs in order of having situation information with highest approximation (Step D6). After that, the bookmark sorting section 108 sends out a result from the sorting, together with a title, to the browser processing section 105 (Step D7). By the above operations, the browser processing section 105 having received a result from the sorting of the URLs sent out from the bookmark sorting section 108 displays a table of titles of the URLs on the displaying section 104 in order of being sorted (Step D8).

Next, one example of a method for calculating an approximation of situation information is described below. First, an approximation for each situation information corresponding

TABLE 2

| URL | Title | Information about positions (longitude and latitude) | Information about time | Information about day of week |
|---|---|---|---|---|
| http://kabu.co.jp | Stock price | (134.20, 45.30) | 10:00 | Monday |
|  |  | (135.22, 45.20) | 12:00 | Tuesday |
|  |  | (136.26, 47.20) | 15:00 | Wednesday |
| http://douro.co.jp | Information about traffic snarl | (134.33, 45.50) | 8:30 | Friday |
|  |  | (135.33, 48.20) | 8:22 | Sunday |
| http://norikae.co.jp | Guidance of transfer | (134.55, 45.70) | 13:00 | Tuesday |
| . | . | . | . | . |
| . | . | . | . | . |
| . | . | . | . | . |

Figure 2:
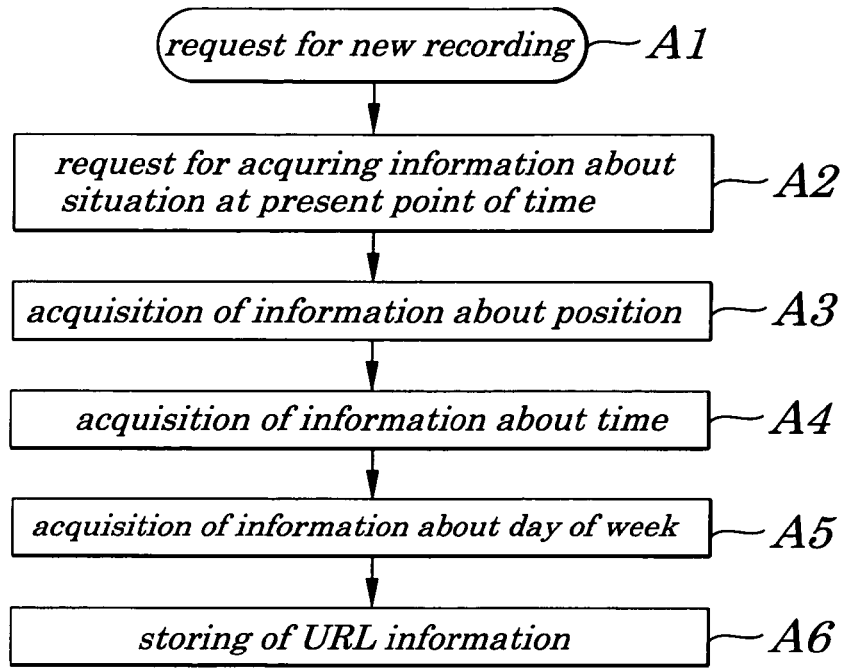
FIG. 2 is a flowchart showing an example of operations of a portable terminal device according to the first embodiment of the present invention.

Operations performed when a request for recording a new bookmark are the same as explained using FIG. 2 and their descriptions are omitted accordingly.

In the embodiment, a request for bookmark sorting is input by a user from an inputting section 102. Also, situation information to be used in sorting URLs is input, in advance, as a sort key and is stored in the sort key storing section 109. The above sort key is input through the inputting section 102 and is stored by a browser processing section 105 in the sort key storing section 109. The sort key that a user can use for to each sort key being set in the sort key storing section 109 is converted into five-stage numbers and if two or more sort keys are specified, a sum of the approximation corresponding to each kinds of sort keys is used as an approximation of the situation information. For example, if position information and time information are specified as a sort key, an approximation of each position information and each time information is calculated and a sum of them is employed as an approximation of the situation information.

An example of a method for calculating an approximation for each situation information is explained (see Table 3).

TABLE 3

| Situation information | Approximation | | | | |
|---|---|---|---|---|---|
| | 1 | 2 | 3 | 4 | 5 |
| Position information | 0 km-1 km | 1 km-2 km | 2 km-3 km | 3 km-4 km | 4 km- |
| Time information | 0 hour-2 hours | 2 hours-4 hours | 4 hours-6 hours | 6 hours-9 hours | 9 hours-12 hours |
| Day-of-week information | 0 day | 1 day | 2 days | 3 days | Non |

To calculate an approximation in the case where a sort key specifies position information, a linear distance between position information that a URL has and position information at a present point of time is calculated first. Next, if the calculated distance is within 1 km, the approximation is defined to be 1, if the distance is within a range of 1 km to 2 km, the approximation to be 2, if the distance is within a range of 2 km to 3 km, the approximation to be 3, if the distance is within a range of 3 km to 4 km, the approximation to be 4, and if the distance is 4 km or more, the approximation to be 5.

Moreover, to calculate an approximation in the case where the sort key specifies time information, a difference between time information that a URL has and time information at a present point of time is calculated first. If the calculated difference is within 2 hours, the approximation is defined to be 1, if the difference is within a range of 2 hours to 4 hours, the approximation to be 2, if the difference is within a range of 4 hours to 6 hours, the approximation to be 3, if the difference is within a range of 6 hours to 9 hours, the approximation to be 4, and if the difference is 9 hours or more, the approximation to be 5.

To calculate an approximation in the case where a sort key specifies a day of a week, a difference between information about a day of a week that a URL has and information about a day of a week at a present point of time is calculated. Then, if the calculated difference is 0 day (that is, a same day), the approximation is defined to be 1, if the difference is 1 day, the approximation is defined to be 2, if the approximation is 2 days, the approximation is defined to be 3, and if the difference is 3 days, the approximation is defined to be 4 (since the difference cannot be 4 or more, the approximation of a day of a week is up to 4.). In the calculated example, information having a smaller sum of the approximation becomes the information being nearer to a present situation.

After the approximation has been calculated as above, the browser processing section 105 displays a result from sorting obtained from the bookmark sorting section 108 on the displaying section 104.

Figure 6:
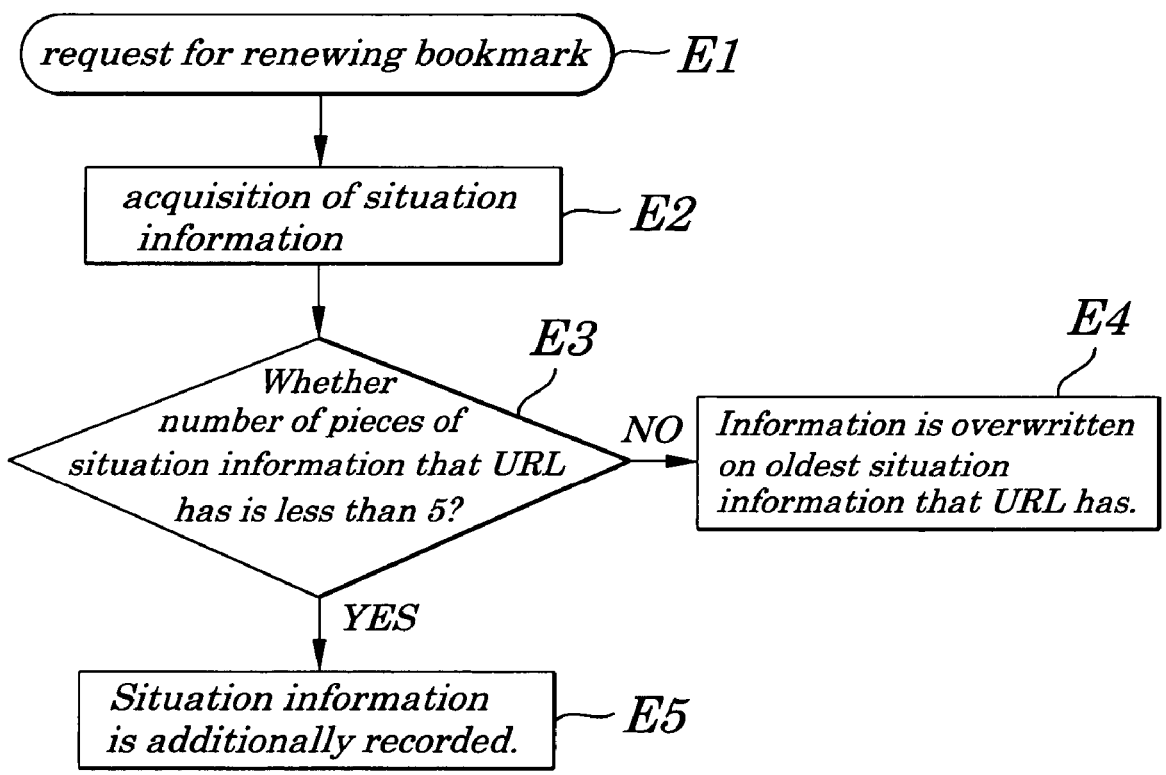
FIG. 6 is also a flowchart showing an example of operations of the portable terminal device according to the second embodiment of the present invention.

Next, operations performed when a URL is selected by a user from a table displayed on the displaying section 104 and the selected URL is referenced to, are described by referring to a flowchart in FIG. 6.

When an instruction to select a specified URL is input from the inputting section 102 from a table of the URLs, the browser processing section 105 acquires a file of a HTML format from the specified URL and displays a content of the acquired file on the displaying section 104. Then, the browser processing section 105 informs the bookmark managing section 107 of the selected URL and makes a request of the bookmark managing section 107 to renew information about recording of the bookmark (Step E1 in FIG. 6).

The bookmark managing section 107 having accepted this request acquires information about a use situation at a present point of time from the situation information acquiring section 111 (Step E2). After that, the bookmark managing section 107, based on a judgement made in Step E3, stores (or records) information in situation information address of the present URL being stored in the bookmark storing section 110. First, when the number of pieces of situation information that a URL holds has already reached the number (for example, 5 pieces) of pieces of situation information that the URL can hold, the bookmark managing section 107 overwrites situation information newly obtained on the oldest situation information that the present URL holds (Step E4). On the other hand, if the former has not reached the latter, the bookmark managing section 107 additionally records the situation information newly obtained (Step E5).

By operating as above, not only sorting based on single situation information such as the information about positions, information about a day of a week, information about time or a like but also sorting based on two or more pieces of situation information is made possible. As a result, when there is, for example, a URL which is often referenced only when a user is at home (information about a position) in the morning (information about time) of Saturday (information about a day of a week) and if a bookmark is displayed under these conditions, even when there is another URL that was referenced on Saturday in the past or another URL that was referenced at home, it is made possible that a URL which was referenced at home in the morning of Saturday in the past is displayed with top priority.

Moreover, in the methods shown in FIGS. 2 and 3, since situation information that a URL holds is renewed every time a URL recorded in a bookmark is selected and referenced, there is a risk that sorting order changes frequently. However, in the methods shown in FIGS. 5 and 6, by enabling each of the URLs to hold two or more pieces of situation information, a state in which order of sorting the bookmark changes frequently can be avoided.

As described above, according to the present embodiment, a URL is sorted in order of a greater possibility of being most referenced based on a history of a past reference depending on a situation in which a portable terminal device is used and is displayed. Therefore, even when the number of the URLs being recorded in a bookmark increases, a targeted URL can be retrieved rapidly. Moreover, since a URL is automatically sorted, setting of order of displaying a bookmark by a user is not required. Furthermore, according to the present embodiment, since a URL that was used in the same situation in the past is displayed with priority, existence of a homepage being considered to be useful in a situation where a portable terminal device is used is displayed for a user.

It is apparent that the present invention is not limited to the above embodiments but may be changed and modified without departing from the scope and spirit of the invention.

What is claimed is:

1. A portable terminal device comprising:
   a communication control unit being connected to an internet communication network to feed and receive information;
   a browser processing unit to acquire a file being stored in a server over said internet communication network connected through said communication control unit;
   a sort key storing unit in which sort keys are stored;
   a bookmark storing unit in which a bookmark recording a URL (Uniform Resource Locator) of a server over said internet communication network is stored;
   a situation information acquiring unit to acquire situation information showing a state occurring when said browser processing unit has obtained a file through said internet communication network;
   a bookmark managing unit to record a URL of a server storing a file that said browser processing unit has obtained through said internet communication network in a bookmark being stored in said bookmark storing unit in such a manner that situation information that said situation information acquiring unit has acquired is annexed to said URL;
   a bookmark sorting unit to sort URLs being recorded in a bookmark stored in said bookmark storing unit depending on a use situation; and
   a displaying unit to display URLs sorted by said bookmark sorting unit,
   wherein the bookmark sorting unit converts into numbers a degree of approximation between the situation information annexed to each of the URLs and a situation information at a present point of time and sorts the URLs in order of having approximation of the situation information with smallest to highest approximation, and
   wherein if the bookmark sorting unit acquiring at least one sort key comprises acquiring at least two sort keys, a sum of the approximation corresponding to each of the sort key is used as an approximation of the situation information.

* * * * *